US012624227B2

(12) United States Patent
Izumi et al.

(10) Patent No.: US 12,624,227 B2

(45) Date of Patent: May 12, 2026

(54) MANUFACTURING METHOD FOR THERMAL INSULATING MATERIAL

(71) Applicant: Resonac Corporation, Tokyo (JP)

(72) Inventors: Hiroyuki Izumi, Tokyo (JP); Kei Togasaki, Tokyo (JP); Hiroshi Yokota, Tokyo (JP)

(*) Notice: Subject to any disclaimer, the term of this patent is extended or adjusted under 35 U.S.C. 154(b) by 659 days.

(21) Appl. No.: 17/795,878

(22) PCT Filed: Jan. 29, 2021

(86) PCT No.: PCT/JP2021/003314

§ 371 (c)(1),
(2) Date: Jul. 28, 2022

(87) PCT Pub. No.: WO2021/153755

PCT Pub. Date: Aug. 5, 2021

(65) Prior Publication Data

US 2023/0151227 A1 May 18, 2023

(30) Foreign Application Priority Data

Jan. 31, 2020 (WO) .................. PCT/JP2020/003803

(51) Int. Cl.

| | |
|---|---|
| ***B05D 3/00*** | (2006.01) |
| ***C09D 5/18*** | (2006.01) |
| ***C09D 7/62*** | (2018.01) |
| ***C09D 101/08*** | (2006.01) |
| ***F16L 59/02*** | (2006.01) |
| *B05D 1/02* | (2006.01) |
| *B05D 1/28* | (2006.01) |

(52) U.S. Cl.

CPC ................. *C09D 5/18* (2013.01); *C09D 7/62* (2018.01); *C09D 101/08* (2013.01); *F16L 59/02* (2013.01); *B05D 1/02* (2013.01); *B05D 1/28* (2013.01); *B05D 3/007* (2013.01)

(58) Field of Classification Search

CPC ... B05D 1/02; B05D 1/18; B05D 1/26; B05D 1/28; B05D 1/30; B05D 3/007; C09D 5/18; C09D 7/62; C09D 101/08; C09D 101/28; C09D 133/00; C09D 183/04; C09D 201/02; F16L 59/02; C08K 7/22; C08K 7/26; C08J 9/28; C08J 2205/026; C08J 2383/04; C08L 1/00; Y02A 30/24; Y02A 80/10

See application file for complete search history.

(56) References Cited

U.S. PATENT DOCUMENTS

| | | | | |
|---|---|---|---|---|
| 4,485,089 | A | 11/1984 | Leipold | |
| 2020/0048100 | A1 | 2/2020 | Yu et al. | |
| 2020/0248011 | A1* | 8/2020 | Kogure et al. | C09D 133/10 |
| 2023/0114711 | A1* | 4/2023 | Togasaki | C08J 9/28 524/859 |

FOREIGN PATENT DOCUMENTS

| | | | |
|---|---|---|---|
| CN | 1622852 | 6/2005 | |
| CN | 102666669 | 9/2012 | |
| CN | 107921730 | 4/2018 | |
| CN | 108778996 | 11/2018 | |
| CN | 109790318 | 5/2019 | |
| EP | 1966289 | 9/2008 | |
| EP | 3281968 | 10/2019 | |
| FR | 2975691 | 11/2012 | |
| JP | 2000-026609 | 1/2000 | |
| JP | 2008-031044 | 2/2008 | |
| JP | 2012-091943 | 5/2012 | |
| JP | 2012-233110 | 11/2012 | |
| JP | 5250900 | 7/2013 | |
| JP | 2014-035044 | 2/2014 | |
| JP | 2017-210446 | 11/2017 | |
| JP | 2018-043927 | 3/2018 | |
| JP | 2019-119691 | 7/2019 | |
| JP | 2019-182728 | 10/2019 | |
| WO | 2007/047970 | 4/2007 | |
| WO | 2017/038648 | 3/2017 | |
| WO | 2019/069404 | 4/2019 | |
| WO | 2019/069412 | 4/2019 | |
| WO | 2019/069492 | 4/2019 | |
| WO | 2019/069494 | 4/2019 | |
| WO | 2019/069495 | 4/2019 | |
| WO | WO-2019069492 A1 * | 4/2019 | C08K 7/26 |
| WO | 2020/012553 | 1/2020 | |
| WO | 2020/208756 | 10/2020 | |
| WO | 2020/209131 | 10/2020 | |

OTHER PUBLICATIONS

International Preliminary Report on Patentability with Written Opinion dated Aug. 11, 2022 for PCT/JP2020/003789.
International Preliminary Report on Patentability with Written Opinion dated Aug. 11, 2022 for PCT/JP2020/003803.
International Preliminary Report on Patentability with Written Opinion dated Aug. 11, 2022 for PCT/JP2021/003314.
International Preliminary Report on Patentability with Written Opinion dated Aug. 11, 2022 for PCT/JP2021/003335.
International Search Report dated Apr. 6, 2021 for PCT/JP2021/003314.
International Search Report dated Apr. 14, 2020 for PCT/JP2020/003803.

(Continued)

*Primary Examiner* — William P Fletcher, III

(74) *Attorney, Agent, or Firm* — SHIPWAY IP

(57) ABSTRACT

A manufacturing method for a thermal insulating material, including: an applying step of applying a coating liquid obtained by mixing aerogel particles, a water-soluble polymer having a hydrophobic group, and a liquid medium such that the aerogel particles are aggregated, with a coating means applying a pressure of 1.5 MPa or less to the coating liquid to obtain a coated film; and a removing step of removing at least a part of the liquid medium from the coated film to obtain a thermal insulating material.

13 Claims, No Drawings

(56) References Cited

OTHER PUBLICATIONS

International Search Report dated Apr. 14, 2020 for PCT/JP2020/003789.
International Search Report dated Apr. 6, 2021 for PCT/JP2021/003335.
Soei Patent and Law Firm, Statement of Related Matters, dated Aug. 19, 2022.
Extended Search Report in corresponding European Application No. 21748040.9, dated May 23, 2023.
Siyi Li and Fengxia Cheng, "Leather and Fur Machinery", Beijing Light Industry Press, Nov. 30, 2015, p. 170 (with English partial translation).
Jiufang Duan, "Natural polymer materials", 2016 (with English partial translation).

* cited by examiner

MANUFACTURING METHOD FOR THERMAL INSULATING MATERIAL

CROSS-REFERENCE TO RELATED APPLICATIONS

This application is a 35 U.S.C. § 371 national phase application of PCT/JP2021/003314, filed on Jan. 29, 2021, which claims priority to PCT/JP2020/003803, filed on Jan. 31, 2020.

TECHNICAL FIELD

The present invention relates to a manufacturing method for a thermal insulating material.

BACKGROUND ART

Aerogel is known as a material excellent in thermal insulating properties. In addition, a method is proposed in which aerogel is processed into the shape of particles to be used as a constitutional material of a thermal insulating material (for example, Patent Literatures 1 and 2). In Patent Literature 1, it is proposed to use particulate aerogel as a filler between resin plates and the like configuring a thermal insulated window. In Patent Literature 2, a method is disclosed in which an intermediate product obtained by preparing a water dispersion containing aerogel particles and organic fibers, and then, by vaporizing water is further press-molded to manufacture a thermal insulating material (molded product).

CITATION LIST

Patent Literature

Patent Literature 1: Japanese Unexamined Patent Publication No. 2012-91943

Patent Literature 2: Japanese Unexamined Patent Publication No. 2014-35044

SUMMARY OF INVENTION

Technical Problem

It is expected that a composite material obtained by dispersing aerogel particles in a resin component has excellent heat resistance. However, when forming such a composite material into a coating liquid, there were problems that the resin component is impregnated into fine pores of the aerogel particles, a fine pore structure is lost, and thermal insulating properties decrease, and the strength of a coated film is not sufficiently obtained and cracks are likely to occur.

Therefore, an object of the present invention is to provide a manufacturing method for a thermal insulating material in which the impregnation of a resin component into fine pores of aerogel particles is suppressed, and a thermal insulating material having high thermal insulating properties and high film formability can be obtained.

Solution to Problem

One aspect of the present invention relates to a manufacturing method for a thermal insulating material, including: an applying step of applying a coating liquid obtained by mixing aerogel particles, a water-soluble polymer having a hydrophobic group, and a liquid medium such that the aerogel particles are aggregated, with a coating means applying a pressure of 1.5 MPa or less to the coating liquid to obtain a coated film; and a removing step of removing at least a part of the liquid medium from the coated film to obtain the thermal insulating material.

In the coating liquid of the manufacturing method described above, a contact interface between the aerogel particles and a resin component is reduced by the aggregation of the aerogel particles, and the impregnation of the resin component into fine pores of the aerogel particles is suppressed. In addition, in the coating liquid described above, since the aggregates of the aerogel particles prepared in advance are not compounded, but the aerogel particles are aggregated when mixed with other components, the aerogel particles and the aggregates thereof are evenly dispersed, and the unevenness, the cracks, and the like of the coated film due to uneven distribution of the aerogel particles can be suppressed. Further, in the manufacturing method described above, since the water-soluble polymer having a hydrophobic group is used as the resin component, the dispersibility of the aerogel particles is further improved, and even when increasing a filling rate of the aerogel particles, the aerogel particles and the aggregates thereof are evenly dispersed in the coating liquid. Then, in the manufacturing method described above, by using the coating means applying a pressure of 1.5 MPa or less to the coating liquid, the aggregates are prevented from being crushed by a load during the coating. Therefore, according to the manufacturing method described above, the thermal insulating material having high thermal insulating properties and high film formability is obtained.

In one aspect, the coating liquid may contain aggregates of the aerogel particles, and an average diameter of the aggregates may be 2 to 40 times an average diameter of the aerogel particles. According to the coating liquid containing such aggregates, the effects described above are more remarkably exhibited.

In one aspect, when observing a diluted solution obtained by diluting the coating liquid with an optical microscope, an area occupied by the aggregates having a diameter of 20 μm or more relative to an area occupied by the aerogel particles and the aggregates of the aerogel particles within an observation visual field may be 50% or more. Accordingly, the effects described above are more remarkably exhibited.

In one aspect, a total content of the aerogel particles and the aggregates of the aerogel particles in the coating liquid may be 70 volume % or more, on the basis of a total volume of solid contents.

In one aspect, the water-soluble polymer may include a cellulosic resin.

In one aspect, a pore volume of the thermal insulating material may be 0.15 $g/cm^3$ or more.

Advantageous Effects of Invention

According to the present invention, a manufacturing method for a thermal insulating material is provided in which the impregnation of a resin component into fine pores of aerogel particles is suppressed, and a thermal insulating material having high thermal insulating properties and high film formability can be obtained.

DESCRIPTION OF EMBODIMENTS

Hereinafter, a preferred embodiment of the present invention will be described in detail. Here, the present invention is not limited to the following embodiment. Herein, a numerical range represented by using "to" indicates a range including numerical values before and after "to" as the minimum value and the maximum value, respectively. "A or B" may include any one of A and B, or may include both. Materials exemplified in this embodiment can be used alone, or two or more types thereof can be used in combination, unless otherwise noted.

A manufacturing method for a thermal insulating material according to this embodiment includes an applying step of applying a coating liquid obtained by mixing aerogel particles, a water-soluble polymer having a hydrophobic group, and a liquid medium such that the aerogel particles are aggregated, with a coating means applying a pressure of 1.5 MPa or less to the coating liquid to obtain a coated film, and a removing step of removing at least a part of the liquid medium from the coated film to obtain the thermal insulating material.

In the coating liquid of the manufacturing method of this embodiment, a contact interface between the aerogel particles and a resin component is reduced by the aggregation of the aerogel particles, and the impregnation of the resin component into fine pores of the aerogel particles is suppressed. In addition, in the coating liquid described above, since the aggregates of the aerogel particles prepared in advance are not compounded, but the aerogel particles are aggregated when mixed with other components, the aerogel particles and the aggregates thereof are evenly dispersed, and the unevenness, the cracks, and the like of the coated film due to uneven distribution of the aerogel particles can be suppressed. Further, in the manufacturing method described above, since the water-soluble polymer having a hydrophobic group is used as the resin component, the dispersibility of the aerogel particles is further improved, and even when increasing a filling rate of the aerogel particles, the aerogel particles and the aggregates thereof are evenly dispersed in the coating liquid. Then, in the manufacturing method described above, by using the coating means applying a pressure of 1.5 MPa or less to the coating liquid, the aggregates are prevented from being crushed by a load during the coating. Therefore, according to the manufacturing method described above, the thermal insulating material having high thermal insulating properties and high film formability is obtained.

<Aerogel>

In a more limited sense, dried gel obtained by using a supercritical drying method with respect to wet gel is referred to as aerogel, dried gel obtained by being dried at the atmospheric pressure is referred to as xerogel, and dried gel obtained by freeze drying is referred to as cryogel, but in this embodiment, obtained low-density dried gel is referred to as "aerogel" regardless of the drying methods of the wet gel. That is, in this embodiment, the "aerogel" indicates "gel comprised of a microporous solid in which the dispersed phase is a gas" that is aerogel in a broad sense. In general, the aerogel has a net-like microstructure inside, and has a cluster structure in which particulate aerogel components of approximately 2 to 20 nm are combined. There are fine pores of less than 100 nm between skeletons to be formed by such clusters. Accordingly, in the aerogel, a three-dimensional microporous structure is formed.

The aerogel according to this embodiment, for example, is silica aerogel containing silica as a main component. Examples of the silica aerogel include a so-called organic-inorganic hybrid silica aerogel to which an organic group (a methyl group or the like) or an organic chain is introduced.

Examples of the aerogel according to this embodiment include the following aspects. By adopting such aspects, aerogel excellent in thermal insulating properties, flame resistance, heat resistance, and flexibility can be easily obtained. By adopting each of the aspects, aerogel having the thermal insulating properties, the flame resistance, the heat resistance, and the flexibility according to each of the aspects can be obtained.

(First Aspect)

The aerogel according to this embodiment is capable of having a structure represented by General Formula (1) described below. The aerogel according to this embodiment is capable of having a structure represented by General Formula (1a) described below, as a structure including the structure represented by Formula (1).

[Chemical Formula 1]

(1)

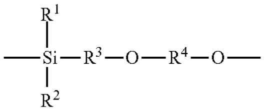

[Chemical Formula 2]

(1a)

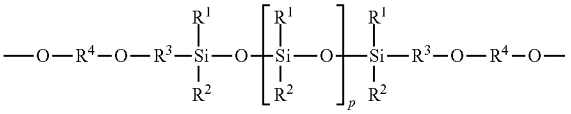

In Formula (1) and Formula (1a), $R^1$ and $R^2$ each independently indicate an alkyl group or an aryl group, and $R^3$ and $R^4$ each independently indicate an alkylene group. Here, examples of the aryl group include a phenyl group, a substituted phenyl group, and the like. Note that, examples of a substituent of the substituted phenyl group include an alkyl group, a vinyl group, a mercapto group, an amino group, a nitro group, a cyano group, and the like. "p" indicates an integer of 1 to 50. In Formula (1a), two or more $R^1$s may be identical to each other or different from each other, and similarly, two or more $R^2$s may be identical to each other or different from each other. In Formula (1a), two $R^3$s may be identical to each other or different from each other, and similarly, two $R^4$s may be identical to each other or different from each other.

By introducing the structure represented by Formula (1) or Formula (1a) described above to the skeleton of the aerogel as the aerogel component, aerogel having low heat conductivity and flexibility is obtained. From such a viewpoint, in Formula (1) and Formula (1a), examples of $R^1$ and $R^2$ each independently include an alkyl group having 1 to 6 carbon atoms, a phenyl group, and the like, and examples of the alkyl group include a methyl group and the like. In addition, in Formula (1) and Formula (1a), examples of $R^3$ and $R^4$ each independently include an alkylene group having 1 to 6 carbon atoms, and the like, and examples of the alkylene group include an ethylene group, a propylene group, and the like. In Formula (1a), "p" can be 2 to 30, and may be 5 to 20.

(Second Aspect)

The aerogel according to this embodiment has a ladder-type structure including struts and bridges, and the bridge is capable of having a structure represented by General Formula (2) described below. By introducing such a ladder-type structure to the skeleton of the aerogel as the aerogel component, heat resistance and mechanical strength can be improved. Note that, in this embodiment, the "ladder-type structure" includes two struts and bridges linking the struts (in the shape of a so-called "ladder"). In this aspect, the skeleton of the aerogel may have the ladder-type structure, and the aerogel may partially have the ladder-type structure.

[Chemical Formula 3]

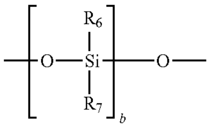

(2)

In Formula (2), $R^5$ and $R^6$ each independently indicate an alkyl group or an aryl group, and "b" indicates an integer of 1 to 50. Here, examples of the aryl group include a phenyl group, a substituted phenyl group, and the like. In addition, examples of a substituent of the substituted phenyl group include an alkyl group, a vinyl group, a mercapto group, an amino group, a nitro group, a cyano group, and the like. Note that, when "b" in Formula (2) is an integer of 2 or more, two or more $R^5$s may be identical to each other or different from each other, and similarly, two or more $R^6$s may be identical to each other or different from each other.

By introducing the structure described above to the skeleton of the aerogel as the aerogel component, for example, aerogel having more excellent flexibility than aerogel having a structure derived from ladder-type silsesquioxane of the related art (that is, having a structure represented by General Formula (X) described below) is obtained. The silsesquioxane is polysiloxane having Composition Formula: $(RSiO_{1.5})_n$, and is capable of having various skeleton structures such as a polyhedral structure, a ladder-type structure, and random structure. Note that, as represented in General Formula (X) described below, in the aerogel having the structure derived from the ladder-type silsesquioxane of the related art, the structure of the bridge is —O—, but in the aerogel according to this embodiment, the structure of the bridge is the structure represented by General Formula (2) described above (a polysiloxane structure). Here, the aerogel of this aspect may further have a structure derived from silsesquioxane, in addition to the structure represented by General Formula (2).

[Chemical Formula 4]

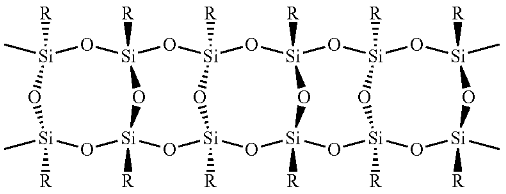

(X)

In Formula (X), R indicates a hydroxy group, an alkyl group, or an aryl group.

Structures to be the struts and a chain length thereof, and an interval between structures to be the bridges are not particularly limited, and from the viewpoint of further improving the heat resistance and the mechanical strength, the ladder-type structure may include a ladder-type structure represented by General Formula (3) described below.

[Chemical Formula 5]

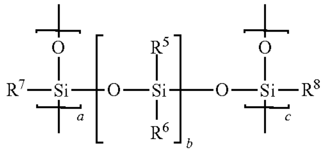

(3)

In Formula (3), $R^5$, $R^6$, $R^7$, and $R^8$ each independently indicate an alkyl group or an aryl group, "a" and "c" each independently indicate an integer of 1 to 3000, and "b" indicates an integer of 1 to 50. Here, examples of the aryl group include a phenyl group, a substituted phenyl group, and the like. In addition, examples of a substituent of the substituted phenyl group include an alkyl group, a vinyl group, a mercapto group, an amino group, a nitro group, a cyano group, and the like. Note that, when "b" in Formula (3) is an integer of 2 or more, two or more $R^5$s may be identical to each other or different from each other, and similarly, two or more R's may be identical to each other or different from each other. In addition, when "a" in Formula (3) is an integer of 2 or more, two or more $R^7$s may be identical to each other or different from each other, and similarly, when "c" is an integer of 2 or more, two or more $R^8$s may be identical to each other or different from each other.

Note that, from the viewpoint of obtaining more excellent flexibility, in Formulas (2) and (3), examples of $R^5$, $R^6$, $R^7$, and $R^8$ (here, $R^7$ and $R^8$ are only in Formula (3)) each independently include an alkyl group having 1 to 6 carbon atoms, a phenyl group, and the like, and examples of the alkyl group include a methyl group and the like. In addition, in Formula (3), "a" and "c" each can be independently 6 to 2000, and may be 10 to 1000. In addition, in Formulas (2) and (3), "b" can be 2 to 30, and may be 5 to 20.

(Third Aspect)

The aerogel according to this embodiment may be a dried product of wet gel that is a condensate of sol containing at least one type selected from the group consisting of a silicon compound having a hydrolyzable functional group or a condensable functional group and a hydrolyzed product of a silicon compound having a hydrolyzable functional group (obtained by drying wet gel generated from sol: a dried product of wet gel derived from sol). Note that, the aerogel that has been described so far may be obtained by drying wet gel generated from sol containing a silicon compound or the like, as described above.

A polysiloxane compound can be used as the silicon compound having a hydrolyzable functional group or a condensable functional group. That is, the sol described above is capable of containing at least one type of compound selected from the group consisting of a polysiloxane compound having a hydrolyzable functional group or a condensable functional group and a hydrolyzed product of a polysiloxane compound having a hydrolyzable functional group (hereinafter, referred to as a "polysiloxane compound group" in some cases).

The functional group of the polysiloxane compound is not particularly limited, and can be a group that reacts with the same functional group or reacts with other functional groups. Examples of the hydrolyzable functional group include an alkoxy group. Examples of the condensable functional group include a hydroxyl group, a silanol group, a carboxyl group, a phenolic hydroxyl group, and the like. The hydroxyl group may be included in a hydroxyl group-containing group such as a hydroxyalkyl group. Note that, the polysiloxane compound having a hydrolyzable functional group or a condensable functional group may further have a reactive group different from the hydrolyzable functional group and the condensable functional group (a functional group not corresponding to the hydrolyzable functional group and the condensable functional group). Examples of the reactive group include an epoxy group, a mercapto group, a glycidoxy group, a vinyl group, an acryloyl group, a methacryloyl group, an amino group, and the like. The epoxy group may be included in an epoxy group-containing group such as a glycidoxy group. The polysiloxane compound having a functional group and a reactive group may be used alone, or two or more types thereof may be used by being mixed. In such functional groups and reactive groups, examples of a group that improves the flexibility of the aerogel include an alkoxy group, a silanol group, a hydroxyalkyl group, and the like, and among them, the alkoxy group and the hydroxyalkyl group are capable of further improving the compatibility of the sol. In addition, the number of carbon atoms of the alkoxy group and the hydroxyalkyl group can be 1 to 6 from the viewpoint of improving the reactivity of the polysiloxane compound and of reducing the heat conductivity of the aerogel, and may be 2 to 5 or 2 to 4 from the viewpoint of further improving the flexibility of the aerogel.

Examples of the polysiloxane compound having a hydroxyalkyl group in the molecule include a polysiloxane compound having a structure represented by General Formula (A) described below. By using the polysiloxane compound having the structure represented by General Formula (A) described below, the structures represented by General Formula (1) and Formula (1a) can be introduced to the skeleton of the aerogel.

[Chemical Formula 6]

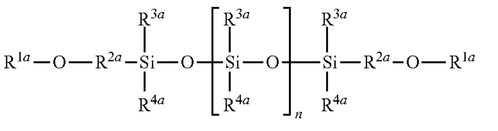

(A)

In Formula (A), $R^{1a}$ indicates a hydroxyalkyl group, $R^{2a}$ indicates an alkylene group, $R^{3a}$ and $R^{4a}$ each independently indicate an alkyl group or an aryl group, and "n" indicates an integer of 1 to 50. Here, examples of the aryl group include a phenyl group, a substituted phenyl group, and the like. In addition, examples of a substituent of the substituted phenyl group include an alkyl group, a vinyl group, a mercapto group, an amino group, a nitro group, a cyano group, and the like. Note that, in Formula (A), two $R^{1a}$s may be identical to each other or different from each other, and similarly, two $R^{2a}$s may be identical to each other or different from each other. In addition, in Formula (A), two or more $R^{3a}$s may be identical to each other or different from each other, and similarly, two or more $R^{4a}$s may be identical to each other or different from each other.

By using the wet gel that is the condensate of the sol (generated from the sol) containing the polysiloxane compound having the structure described above, the aerogel having low heat conductivity and flexibility is more easily obtained. From such a viewpoint, in Formula (A), examples of $R^{1a}$ include a hydroxyalkyl group having 1 to 6 carbon atoms, and the like, and examples of the hydroxyalkyl group include a hydroxyethyl group, a hydroxypropyl group, and the like. In addition, in Formula (A), examples of $R^{2a}$ include an alkylene group having 1 to 6 carbon atoms, and the like, and examples of the alkylene group include an ethylene group, a propylene group, and the like. In addition, in Formula (A), examples of $R^{3a}$ and $R^{4a}$ each independently include an alkyl group having 1 to 6 carbon atoms, a phenyl group, and the like, and examples of the alkyl group include a methyl group and the like. In addition, in Formula (A), "n" can be 2 to 30, and may be 5 to 20.

As the polysiloxane compound having the structure represented by General Formula (A) described above, a commercially available product can be used, and examples thereof include a compound such as X-22-160AS, KF-6001, KF-6002, and KF-6003 (all are manufactured by Shin-Etsu Chemical Co., Ltd.), a compound such as XF42-B0970 and Fluid OFOH 702-4% (all are manufactured by Momentive Inc.), and the like.

Examples of the polysiloxane compound having an alkoxy group in the molecule include a polysiloxane compound having a structure represented by General Formula (B) described below. By using the polysiloxane compound having the structure represented by General Formula (B) described below, the ladder-type structure including the bridges represented by General Formula (2) or (3) can be introduced to the skeleton of the aerogel.

[Chemical Formula 7]

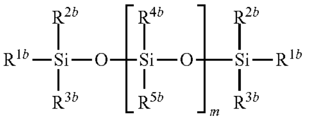

(B)

In Formula (B), $R^{1b}$ indicates an alkyl group, an alkoxy group, or an aryl group, $R^{2b}$ and $R^{3b}$ each independently indicate an alkoxy group, $R^{4b}$ and $R^{5b}$ each independently indicate an alkyl group or an aryl group, and "m" indicates an integer of 1 to 50. Here, examples of the aryl group include a phenyl group, a substituted phenyl group, and the like. In addition, examples of a substituent of the substituted phenyl group include an alkyl group, a vinyl group, a mercapto group, an amino group, a nitro group, a cyano group, and the like. Note that, in Formula (B), two $R^{1b}$s may be identical to each other or different from each other, two $R^{2b}$s may be identical to each other or different from each other, and similarly, two $R^{3b}$s may be identical to each other or different from each other. In addition, when "m" in Formula (B) is an integer of 2 or more, two or more $R^{4b}$s may be identical to each other or different from each other, and similarly, two or more $R^{5b}$s may be identical to each other or different from each other.

By using the wet gel that is the condensate of the sol (generated from the sol) containing the polysiloxane compound having the structure described above or the hydrolyzed product thereof, the aerogel having low heat conductivity and flexibility is more easily obtained. From such a viewpoint, in Formula (B), examples of $R^{1b}$ include an alkyl group having 1 to 6 carbon atoms, an alkoxy group having 1 to 6 carbon atoms, and the like, and examples of the alkyl group or the alkoxy group include a methyl group, a methoxy group, an ethoxy group, and the like. In addition, in Formula (B), examples of $R^{2b}$ and $R^{3b}$ each independently include an alkoxy group having 1 to 6 carbon atoms, and the like, and examples of the alkoxy group include a methoxy group, an ethoxy group, and the like. In addition, in Formula (B), examples of $R^{4b}$ and $R^{5b}$ each independently include an alkyl group having 1 to 6 carbon atoms, a phenyl group, and the like, and examples of the alkyl group include a methyl group and the like. In addition, in Formula (B), "m" can be 2 to 30, and may be 3 to 35 or 5 to 20.

The polysiloxane compound having the structure represented by General Formula (B) described above can be obtained by suitably referring to a manufacturing method reported in Japanese Unexamined Patent Publication No. 2000-26609, Japanese Unexamined Patent Publication No. 2012-233110, and the like. In addition, XR31-B1410 (manufactured by Momentive Inc.) can also be used as the polysiloxane compound.

Note that, since an alkoxy group is hydrolyzed, there is a possibility that the polysiloxane compound having an alkoxy group exists in the sol as the hydrolyzed product, and the polysiloxane compound having an alkoxy group and the hydrolyzed product thereof may be mixed. In addition, in the polysiloxane compound having an alkoxy group, the alkoxy groups in the molecule may be totally hydrolyzed or partially hydrolyzed.

The polysiloxane compound having a hydrolyzable functional group or a condensable functional group and the hydrolyzed product of the polysiloxane compound having a hydrolyzable functional group may be used alone, or two or more types thereof may be used by being mixed.

When preparing the aerogel according to this embodiment, a silicon compound other than the polysiloxane compound described above can be used as the silicon compound having a hydrolyzable functional group or a condensable functional group. That is, the sol containing the silicon compound described above is capable of containing at least one type selected from the group consisting of the silicon compound having a hydrolyzable functional group or a condensable functional group (excluding the polysiloxane compound) and the hydrolyzed product of the silicon compound having a hydrolyzable functional group (hereinafter, referred to as a "silicon compound group" in some cases), in addition to the polysiloxane compound group described above or instead of the polysiloxane compound group described above. The number of silicon atoms in the molecule of the silicon compound can be 1 or 2.

The silicon compound having a hydrolyzable functional group in the molecule is not particularly limited, and examples thereof include alkyl silicon alkoxide and the like. In the alkyl silicon alkoxide, the number of hydrolyzable functional groups can be 3 or less, from the viewpoint of improving water resistance. Examples of such alkyl silicon alkoxide include monoalkyl trialkoxysilane, monoalkyl dialkoxysilane, dialkyl dialkoxysilane, monoalkyl monoalkoxysilane, dialkyl monoalkoxysilane, trialkyl monoalkoxysilane, and the like, and specifically include methyl trimethoxysilane, methyl dimethoxysilane, dimethyl diethoxysilane, dimethyl dimethoxysilane, ethyl trimethoxysilane, hexyl trimethoxysilane, and the like. Here, examples of the hydrolyzable functional group include an alkoxy group such as a methoxy group and an ethoxy group, and the like.

The silicon compound having a condensable functional group is not particularly limited, and examples thereof include silane tetraol, methyl silane triol, dimethyl silane diol, phenyl silane triol, phenyl methyl silane diol, diphenyl silane diol, n-propyl silane triol, hexyl silane triol, octyl silane triol, decyl silane triol, trifluoropropyl silane triol, and the like.

The silicon compound having a hydrolyzable functional group or a condensable functional group may further have the reactive group described above that is different from the hydrolyzable functional group and the condensable functional group (the functional group not corresponding to the hydrolyzable functional group and the condensable functional group).

As a silicon compound having 3 or less hydrolyzable functional groups and a reactive group, vinyl trimethoxysilane, 3-glycidoxypropyl trimethoxysilane, 3-glycidoxypropyl methyl dimethoxysilane, 3-methacryloxypropyl trimethoxysilane, 3-methacryloxypropyl methyl dimethoxysilane, 3-acryloxypropyl trimethoxysilane, 3-mercaptopropyl trimethoxysilane, 3-mercaptopropyl methyl dimethoxysilane, N-phenyl-3-aminopropyl trimethoxysilane, N-2-(aminoethyl)-3-aminopropyl methyl dimethoxysilane, and the like can also be used.

In addition, as a silicon compound having a condensable functional group and a reactive group, vinyl silane triol, 3-glycidoxypropyl silane triol, 3-glycidoxypropyl methyl silane diol, 3-methacryloxypropyl silane triol, 3-methacryloxypropyl methyl silane diol, 3-acryloxypropyl silane triol, 3-mercaptopropyl silane triol, 3-mercaptopropyl methyl silane diol, N-phenyl-3-aminopropyl silane triol, N-2-(aminoethyl)-3-aminopropyl methyl silane diol, and the like can also be used.

Further, bistrimethoxysilyl methane, bistrimethoxysilyl ethane, bistrimethoxysilyl hexane, ethyl trimethoxysilane, vinyl trimethoxysilane, and the like, which are a silicon compound having three or less hydrolyzable functional groups on the molecular end, can also be used.

The silicon compound having a hydrolyzable functional group or a condensable functional group (excluding the polysiloxane compound) and the hydrolyzed product of the silicon compound having a hydrolyzable functional group may be used alone, or two or more types thereof may be used by being mixed.

By using the silicon compound described above (excluding the polysiloxane compound), structures represented by General Formulas (4) to (6) described below can be introduced to the skeleton of the aerogel. The aerogel according to this embodiment is capable of having any one or two or more of the structures.

[Chemical Formula 8]

(4)

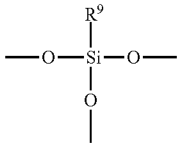

In Formula (4), $R^9$ indicates an alkyl group. Here, examples of the alkyl group include an alkyl group having 1 to 6 carbon atoms, and the like, and examples of the alkyl group include a methyl group and the like.

[Chemical Formula 9]

(5)

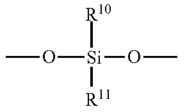

In Formula (5), $R^{10}$ and $R^{11}$ each independently indicate an alkyl group. Here, examples of the alkyl group include an alkyl group having 1 to 6 carbon atoms, and the like, and examples of the alkyl group include a methyl group and the like.

[Chemical Formula 10]

(6)

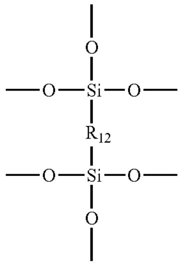

In Formula (6), $R^{12}$ indicates an alkylene group. Here, examples of the alkylene group include an alkylene group having 1 to 10 carbon atoms, and the like, and examples of the alkylene group include an ethylene group, a hexylene group, and the like.

(Fourth Aspect)

The aerogel according to this embodiment may further contain silica particles in addition to the aerogel component, from the viewpoint of further toughening and from the viewpoint of attaining more excellent thermal insulating properties and more excellent flexibility. The aerogel containing the aerogel component and the silica particles can also be referred to as an aerogel composite body. It is considered that although the aerogel composite body is the composite of the aerogel component and the silica particles, the aerogel composite body has the cluster structure that is the feature of the aerogel and has the three-dimensional microporous structure.

The aerogel containing the aerogel component and the silica particles can be referred to as a dried product of wet gel that is a condensate of sol containing at least one type selected from the group consisting of the silicon compound having a hydrolyzable functional group or a condensable functional group and the hydrolyzed product of the silicon compound having a hydrolyzable functional group, and the silica particles. Therefore, the description of the first aspect to the third aspect can also be suitably applied to the aerogel according to this embodiment.

The silica particles can be used without any particular limitation, and examples thereof include amorphous silica particles and the like. Examples of the amorphous silica particles include molten silica particles, fumed silica particles, colloidal silica particles, and the like. Among them, the colloidal silica particles have high monodispersibility and easily suppress the aggregation in the sol. Note that, the silica particles may be silica particles having a hollow structure, a porous structure, and the like.

The shape of the silica particles is not particularly limited, and examples thereof include a spherical shape, a cocoon shape, an associated shape, and the like. Among them, by using spherical particles as the silica particles, the aggregation in the sol is easily suppressed. An average primary particle diameter of the silica particles may be 1 nm or more, 5 nm or more, or 20 nm or more, from the viewpoint of easily applying suitable strength and suitable flexibility to the aerogel and of easily obtaining the aerogel excellent in shrinkage resistance when dried. The average primary particle diameter of the silica particles may be 500 nm or less, 300 nm or less, or 100 nm or less, from the viewpoint of easily suppressing solid heat conduction of the silica particles and of easily obtaining aerogel excellent in the thermal insulating properties. From such a viewpoint, the average primary particle diameter of the silica particles may be 1 to 500 nm, 5 to 300 nm, or 20 to 100 nm.

In this embodiment, an average particle diameter of the aerogel component and the average primary particle diameter of the silica particles can be obtained by directly observing the aerogel with an electron scanning microscope (hereinafter, simply referred to as "SEM"). Here, the "diameter" indicates a diameter when regarding the sectional surface of the particles exposed to the sectional surface of the aerogel as a circle. In addition, the "diameter when regarding the sectional surface as a circle" is the diameter of a true circle when the area of the sectional surface is replaced with the true circle of the same area. Note that, when calculating the average particle diameter, the diameters of the circles of 100 particles are measured, and an average thereof is taken.

Note that, the average particle diameter of the silica particles can also be measured from a raw material. For example, a biaxial average primary particle diameter is calculated from a result obtained by observing arbitrary 20 particles with SEM as follows. That is, when taking colloidal silica particles dispersed in water, in general, at solid contents concentration of approximately 5 to 40 mass %, as an example, a chip obtained by cutting a wafer with pattern wiring into 2 cm square is immersed in a dispersion liquid of the colloidal silica particles for approximately 30 seconds, and then, the chip is rinsed with pure water for approximately 30 seconds and dried with nitrogen flow. After that, the chip is placed on a stage for SEM observation, an acceleration voltage of 10 kV is applied, the silica particles are observed at a magnification of 100000 times, and an image is taken. 20 silica particles are arbitrarily selected from the obtained image, and an average of particle diameters of the particles is set to the average particle diameter.

The number of silanol groups per 1 g of the silica particles may be $10\times10^{18}$ pieces/g or more, $50\times10^{18}$ pieces/g or more, or $100\times10^{18}$ pieces/g or more, from the viewpoint of easily obtaining the aerogel excellent in the shrinkage resistance. The number of silanol groups per 1 g of the silica particles may be $1000\times10^{18}$ pieces/g or less, $800\times10^{18}$ pieces/g or less, or $700\times10^{18}$ pieces/g or less, from the viewpoint of easily obtaining homogeneous aerogel. From such a viewpoint, the number of silanol groups per 1 g of the silica particles may be $10\times10^{18}$ to $1000\times10^{18}$ pieces/g, $50\times10^{18}$ to $800\times10^{18}$ pieces/g, or $100\times10^{18}$ to $700\times10^{18}$ pieces/g.

The content of the polysiloxane compound group (the sum of the content of the polysiloxane compound having a hydrolyzable functional group or a condensable functional group and the content of the hydrolyzed product of the polysiloxane compound having a hydrolyzable functional group) contained in the sol described above may be 5 parts by mass or more, or 10 parts by mass or more, with respect to 100 parts by mass of the total amount of the sol, from the viewpoint of more easily obtaining excellent reactivity. The content of the polysiloxane compound group contained in the sol described above may be 50 parts by mass or less, or 30 parts by mass or less, with respect to 100 parts by mass of the total amount of the sol, from the viewpoint of more easily obtaining excellent compatibility. From such a viewpoint, the content of the polysiloxane compound group contained in the sol described above may be 5 to 50 parts by mass, or 10 to 30 parts by mass, with respect to 100 parts by mass of the total amount of the sol.

When the sol described above contains the silicon compound (excluding the polysiloxane compound), the silicon compound group (the sum of the content of the silicon compound having a hydrolyzable functional group or a condensable functional group and the content of the hydrolyzed product of the silicon compound having a hydrolyzable functional group) may be 5 parts by mass or more, 7 parts by mass or more, or 10 parts by mass or more, with respect to 100 parts by mass of the total amount of the sol, from the viewpoint of more easily obtaining excellent reactivity. The content of the silicon compound group contained in the sol described above may be 50 parts by mass or less, 40 parts by mass or less, or 30 parts by mass or less, with respect to 100 parts by mass of the total amount of the sol, from the viewpoint of more easily obtaining excellent compatibility.

When the sol contains both of the polysiloxane compound group and the silicon compound group, a ratio of the content of the polysiloxane compound group and the content of the silicon compound group may be 1:0.5 or more, 1:0.7 or more, or 1:1 or more, from the viewpoint of more easily obtaining excellent compatibility. The ratio of the content of the polysiloxane compound group and the content of the silicon compound group may be 1:4 or less, 1:3 or less, or 1:2 or less, from the viewpoint of more easily suppressing the shrinkage of the gel. From such a viewpoint, the ratio of the content of the polysiloxane compound group and the content of the silicon compound group may be 1:0.5 to 1:4, 1:0.7 to 1:3, or 1:1 to 1:2.

When the silica particles are contained in the sol described above, the content of the silica particles may be 1 part by mass or more, 2 parts by mass or more, or 4 parts by mass or more, with respect to 100 parts by mass of the total amount of the sol, from the viewpoint of easily applying suitable strength to the aerogel and of easily obtaining the aerogel excellent in the shrinkage resistance when dried. The content of the silica particles may be 20 parts by mass or less, 17 parts by mass or less, or 15 parts by mass or less, with respect to 100 parts by mass of the total amount of the sol, from the viewpoint of easily suppressing the solid heat conduction of the silica particles and of easily obtaining the aerogel excellent in the thermal insulating properties. From such a viewpoint, the content of the silica particles may be 1 to 20 parts by mass, 2 to 17 parts by mass, or 4 to 15 parts by mass, with respect to 100 parts by mass of the total amount of the sol.

<Aerogel Particles>

The aerogel particles of this embodiment, for example, can be obtained by pulverizing bulk aerogel as described below.

An average particle diameter D50 (also referred to as an average diameter) of the aerogel particles can be 0.1 to 1000 μm, and may be 0.5 to 700 μm, 1 to 500 μm, 3 to 100 μm, or 5 to 50 μm. When the average particle diameter D50 of the aerogel particles is large, the aerogel particles excellent in dispersibility, handleability, and the like are easily obtained. On the other hand, when the average particle diameter D50 is small, the aerogel particles excellent in dispersibility are easily obtained. The average particle diameter of the aerogel particles can be suitably adjusted by a pulverization method and a pulverization condition, a sieve, a classification method, and the like.

The average particle diameter D50 of the aerogel particles can be measured by a laser diffraction and scattering method. For example, the aerogel particles are added to a solvent (ethanol) such that the content is 0.05 to 5 mass %, and are vibrated with an ultrasonic homogenizer of 50 W for 15 to 30 minutes to disperse the aerogel particles. After that, approximately 10 mL of a dispersion liquid is injected to a laser diffraction and scattering particle diameter distribution measurement device, and a particle diameter is measured at 25° C., a refractive index of 1.3, and absorption of 0. Then, a particle diameter at an integrated value of 50% (volume basis) in a particle diameter distribution is set to the average particle diameter D50. As the measurement device, for example, Microtrac MT3000 (Product Name, manufactured by Nikkiso Co., Ltd.) can be used.

In addition, a commercially available product can also be used as the aerogel particles. Examples of the commercially available product of the aerogel particles include ENOVA MT1100 (manufactured by Cabot Corporation), AeroVa (manufactured by JIOS AEROGEL CORPORATION), and the like.

In this embodiment, as the amount of aerogel particles, the total content of the aerogel particles and the aggregates in the coating liquid is preferably 70 volume % or more, more preferably 72 volume % or more, and even more preferably 74 volume % or more, on the basis of the total volume of solid contents. In addition, as the amount of aerogel particles, the total content of the aerogel particles and the aggregates in the coating liquid, for example, may be 99 volume % or less, 98 volume % or less, or 97 volume % or less, on the basis of the total volume of the solid contents.

<Manufacturing Method for Aerogel Particles>

A manufacturing method for aerogel particles is not particularly limited, and for example, the aerogel particles can be manufactured by the following method.

The aerogel particles of this embodiment can be manufactured by a manufacturing method mainly including a sol generating step, a wet gel generating step of gelating and then aging the sol obtained in the sol generating step to obtain the wet gel, a washing and solvent-substituting step of washing and (as necessary) solvent-substituting the wet gel obtained in the wet gel generating step, a drying step of drying the wet gel that is washed and solvent-substituted, and a pulverizing step of pulverizing aerogel obtained by the drying.

In addition, the aerogel particles may be manufactured by a manufacturing method mainly including a sol generating step, a wet gel generating step, a wet gel pulverizing step of pulverizing the wet gel obtained in the wet gel generating step, a washing and solvent-substituting step, and a drying step.

The size of the obtained aerogel particles can be adjusted by a sieve, classification, and the like. By adjusting the size of the particles, the dispersibility can be increased. Note that, the "sol" indicates a state before a gelation reaction occurs, and in this embodiment, a state where the silicon compound described above and the silica particles in some cases are dissolved or dispersed in a solvent. In addition, the wet gel indicates a gel solid in a wet state that contains a liquid medium but has no fluidity.

(Sol Generating Step)

The sol generating step is a step of mixing the silicon compound and the silica particles in some cases (may be a solvent containing the silica particles), of performing a hydrolysis reaction, and then, of generating the sol. In this step, in order to accelerate the hydrolysis reaction, an acid catalyst may be further added to the solvent. In addition, as described in Japanese Patent No. 5250900, a surfactant, a thermal hydrolyzable compound, and the like can also be added to the solvent. Further, in order to suppress heat-ray radiation or the like, a component such as carbon graphite, an aluminum compound, a magnesium compound, a silver compound, and a titanium compound may be added to the solvent.

As the solvent, for example, water or a mixed liquid of water and alcohol can be used. Examples of the alcohol include methanol, ethanol, n-propanol, 2-propanol, n-butanol, 2-butanol, t-butanol, and the like. Among them, examples of alcohol having a low surface tension and a low boiling point include the methanol, the ethanol, the 2-propanol, and the like, from the viewpoint of reducing an interface tension with a gel wall. Such alcohol may be used alone, or two or more types thereof may be used by being mixed.

For example, when the alcohol is used as the solvent, the amount of alcohol can be 4 to 8 moles, and may be 4 to 6.5 moles, or 4.5 to 6 moles, with respect to 1 mole of the total amount of the silicon compound group and the polysiloxane compound group. By setting the amount of alcohol to 4 moles or more, excellent compatibility is more easily obtained, and by setting the amount of alcohol to 8 moles or less, the shrinkage of the gel is more easily suppressed.

Examples of the acid catalyst include an inorganic acid such as a hydrofluoric acid, a hydrochloric acid, a nitric acid, a sulfuric acid, a sulfurous acid, a phosphoric acid, a phosphorus acid, a hypophosphorous acid, a bromic acid, a chloric acid, a chlorous acid, and a hypochlorous acid; an acidic phosphate such as acidic aluminum phosphate, acidic magnesium phosphate, and acidic zinc phosphate; an organic carboxylic acid such as an acetic acid, a formic acid, a propionic acid, an oxalic acid, a malonic acid, a succinic acid, a citric acid, a malic acid, an adipic acid, and an azelaic acid, and the like. Among them, examples of the acid catalyst for further improving the water resistance of the aerogel to be obtained include the organic carboxylic acid. Examples of the organic carboxylic acid may include an acetic acid, and may be a formic acid, a propionic acid, an oxalic acid, a malonic acid, and the like. Such an acid catalyst may be used alone, or two or more types thereof may be used by being mixed.

By using the acid catalyst, the hydrolysis reaction of the silicon compound is accelerated, and the sol can be obtained in a shorter period of time.

The added amount of the acid catalyst can be 0.001 to 0.1 parts by mass with respect to 100 parts by mass of the total amount of the polysiloxane compound group and the silicon compound group.

As the surfactant, a non-ionic surfactant, an ionic surfactant, and the like can be used. Such a surfactant may be used alone, or two or more types thereof may be used by being mixed.

As the non-ionic surfactant, for example, a compound including a hydrophilic part such as polyoxyethylene and a hydrophobic part mainly containing an alkyl group, a compound including a hydrophilic part such as polyoxypropylene, and the like can be used. Examples of the compound including the hydrophilic part such as polyoxyethylene and the hydrophobic part mainly containing the alkyl group include polyoxyethylene nonyl phenyl ether, polyoxyethylene octyl phenyl ether, polyoxyethylene alkyl ether, and the like. Examples of the compound including the hydrophilic part such as polyoxypropylene include polyoxypropylene alkyl ether, a block copolymer of polyoxyethylene and polyoxypropylene, and the like.

Examples of the ionic surfactant include a cationic surfactant, an anionic surfactant, an amphoteric surfactant, and the like. Examples of the cationic surfactant include cetyl trimethyl ammonium bromide, cetyl trimethyl ammonium chloride, and the like, and examples of the anionic surfactant include sodium dodecyl sulfonate and the like. In addition, examples of the amphoteric surfactant include an amino acid-based surfactant, a betaine-based surfactant, an amine oxide-based surfactant, and the like. Examples of the amino acid-based surfactant include an acyl glutamic acid and the like. Examples of the betaine-based surfactant include lauryl dimethyl aminoacetic acid betaine, stearyl dimethyl aminoacetic acid betaine, and the like. Examples of the amine oxide-based surfactant include lauryl dimethyl amine oxide.

It is considered that such a surfactant decreases a difference in chemoaffinity between the solvent in a reaction system and a growing siloxane polymer, and suppresses phase separation, in the wet gel generating step described below.

The added amount of the surfactant depends on the type of surfactant or the type or the amount of silicon compound, and for example, can be 1 to 100 parts by mass with respect to 100 parts by mass of the total amount of the polysiloxane compound group and the silicon compound group. Note that, the added amount may be 5 to 60 parts by mass.

It is considered that the thermal hydrolyzable compound generates a base catalyst by thermal hydrolysis, makes a reaction solution basic, and accelerates a sol-gel reaction in the wet gel generating step described below. Accordingly, the thermal hydrolyzable compound is not particularly limited insofar as the compound is capable of making the reaction solution basic after the hydrolysis, and examples thereof are capable of including urea; acid amide such as formamide, N-methyl formamide, N,N-dimethyl formamide, acetamide, N-methyl acetamide, and N,N-dimethyl acetamide; a cyclic nitrogen compound such as hexamethylene tetramine, and the like. Among them, the urea particularly easily obtains the acceleration effect described above.

The added amount of the thermal hydrolyzable compound is not particularly limited insofar as the amount is capable of sufficiently accelerating the sol-gel reaction in the wet gel generating step described below. For example, when the urea is used as the thermal hydrolyzable compound, the added amount thereof can be 1 to 200 parts by mass with respect to 100 parts by mass of the total amount of the polysiloxane compound group and the silicon compound group. Note that, the added amount may be 2 to 150 parts by mass. By setting the added amount to 1 part by mass or more, excellent reactivity is more easily obtained, and by setting the added amount to 200 parts by mass or less, the precipitation of crystals and a decrease in a gel density are more easily suppressed.

The hydrolysis in the sol generating step depends on the type and the amount of silicon compound, silica particles, acid catalyst, surfactant, and the like in the mixed liquid, and for example, may be performed at a temperature environment of 20 to 60° C. for 10 minutes to 24 hours, or may be performed at a temperature environment of 50 to 60° C. for 5 minutes to 8 hours. Accordingly, the hydrolyzable functional group of the silicon compound is sufficiently hydrolyzed, and the hydrolyzed product of the silicon compound can be more reliably obtained.

Here, when the thermal hydrolyzable compound is added to the solvent, the temperature environment of the sol generating step may be adjusted to a temperature for suppressing the hydrolysis of the thermal hydrolyzable compound and for suppressing the gelation of the sol. In this case, the temperature may be any temperature insofar as the temperature is capable of suppressing the hydrolysis of the thermal hydrolyzable compound. For example, when the urea is used as the thermal hydrolyzable compound, the temperature environment of the sol generating step can be 0 to 40° C., and may be 10 to 30° C.

(Wet Gel Generating Step)

The wet gel generating step is a step of gelating and then aging the sol obtained in the sol generating step to obtain the wet gel. In this step, a base catalyst can be used in order to accelerate the gelation.

Examples of the base catalyst include carbonates such as calcium carbonate, potassium carbonate, sodium carbonate, barium carbonate, magnesium carbonate, lithium carbonate, ammonium carbonate, copper carbonate (II), iron carbonate (II), and silver carbonate (I); hydrogen carbonates such as calcium hydrogen carbonate, potassium hydrogen carbonate, sodium hydrogen carbonate, and ammonium hydrogen carbonate; an alkali metal hydroxide such as lithium hydroxide, sodium hydroxide, potassium hydroxide, and cesium hydroxide; an ammonium compound such as ammonium hydroxide, ammonium fluoride, ammonium chloride, and ammonium bromide; a basic sodium phosphate such as sodium metaphosphate, sodium pyrophosphate, and sodium polyphosphate; aliphatic amines such as allyl amine, diallyl amine, triallyl amine, isopropyl amine, diisopropyl amine, ethyl amine, diethyl amine, triethyl amine, 2-ethyl hexyl amine, 3-ethoxypropyl amine, diisobutyl amine, 3-(diethyl amino)propyl amine, di-2-ethyl hexyl amine, 3-(dibutyl amino)propyl amine, tetramethyl ethylene diamine, t-butyl amine, sec-butyl amine, propyl amine, 3-(methyl amino) propyl amine, 3-(dimethyl amino)propyl amine, 3-methoxyamine, dimethyl ethanol amine, methyl diethanol amine, diethanol amine, and triethanol amine; nitrogen-containing heterocyclic compounds such as morpholine, N-methyl morpholine, 2-methyl morpholine, piperazine and derivatives thereof, piperidine and derivatives thereof, and imidazole and derivatives thereof, and the like. Among them, the ammonium hydroxide (ammonia water) has high volatility and is less likely to remain in the aerogel particles after the drying, thereby being excellent from the viewpoint of not easily impairing the water resistance and from the viewpoint of economic efficiency. The base catalyst described above may be used alone, or two or more types thereof may be used by being mixed.

By using the base catalyst, a dehydration condensation reaction or a dealcoholization condensation reaction of the silicon compound and the silica particles in the sol can be accelerated, and the sol can be gelated in a shorter period of time. Accordingly, the wet gel having higher strength (rigidity) can also be obtained. In particular, since ammonia has high volatility and is less likely to remain in the aerogel particles, the aerogel particles more excellent in the water resistance can be obtained by using the ammonia as the base catalyst.

The added amount of the base catalyst can be 0.5 to 5 parts by mass, and may be 1 to 4 parts by mass, with respect to 100 parts by mass of the total amount of the polysiloxane compound group and the silicon compound group. By setting the added amount to 0.5 parts by mass or more, the gelation can be performed in a shorter period of time, and by setting the added amount to 5 parts by mass or less, a decrease in the water resistance can be further suppressed.

The sol in the wet gel generating step may be gelated in a closed vessel such that the solvent and the base catalyst are not volatilized. A gelating temperature can be 30 to 90° C., and may be 40 to 80° C. By setting the gelating temperature to 30° C. or higher, the gelation can be performed in a shorter period of time, and the wet gel having higher strength (rigidity) can be obtained. In addition, by setting the gelating temperature to 90° C. or lower, the volatilization of the solvent (in particular, alcohol) is easily suppressed, thereby enabling the gelation to be performed while suppressing volume shrinkage.

The aging in the wet gel generating step may be performed in a closed vessel such that the solvent and the base catalyst are not volatilized. By the aging, the bonding of the components configuring the wet gel is strengthened, and as a result thereof, the wet gel having high strength (rigidity) that is sufficient to suppress the shrinkage when dried can be obtained. An aging temperature can be 30 to 90° C., and may be 40 to 80° C. By setting the aging temperature to 30° C. or higher, the wet gel having higher strength (rigidity) can be obtained, and by setting the aging temperature to 90° C. or lower, the volatilization of the solvent (in particular, alcohol) is easily suppressed, thereby enabling the gelation to be performed while suppressing the volume shrinkage.

Note that, since it is generally difficult to determine a time point when the gelation of the sol is ended, the gelation and the subsequent aging of the sol may be performed consecutively in a set of operations.

A gelating time and an aging time can be suitably set by the gelating temperature and the aging temperature. When the silica particles are contained in the sol, the gelating time can be particularly shortened, compared to a case where the silica particles are not contained in the sol. It is assumed that this is because the silanol group or the reactive group of the silicon compound in the sol forms a hydrogen bond or a chemical bond with the silanol group of the silica particles. Note that, the gelating time can be 10 to 120 minutes, and may be 20 to 90 minutes. By setting the gelating time to 10 minutes or longer, homogeneous wet gel is easily obtained, and by setting the gelating time to 120 minutes or shorter, the washing and solvent-substituting step to the drying step described below can be simplified. Note that, as the entire gelating and aging step, the total time of the gelating time and the aging time can be 4 to 480 hours, and may be 6 to 120 hours. By setting the total time of the gelating time and the aging time to 4 hours or longer, the wet gel having higher strength (rigidity) can be obtained, and by setting the total time to 480 hours or shorter, an aging effect is more easily maintained.

In order to decrease the density of the aerogel particles to be obtained or to increase an average fine pore diameter, the gelating temperature and the aging temperature may be increased in the range described above, or the total time of the gelating time and the aging time may be increased in the range described above. In addition, in order to increase the density of the aerogel particles to be obtained or to decrease the average fine pore diameter, the gelating temperature and the aging temperature may be decreased in the range described above, or the total time of the gelating time and the aging time may be decreased in the range described above.

(Wet Gel Pulverizing Step)

When performing the wet gel pulverizing step, the wet gel obtained in the wet gel generating step is pulverized. The pulverization, for example, can be performed by putting the wet gel in a Henschel-type mixer or by performing the wet gel generating step in the mixer, and by operating the mixer in a suitable condition (the number of rotations and time). In addition, more simply, the pulverization can be performed by putting the wet gel in a closable vessel or by performing the wet gel generating step in the closable vessel, and by shaking the vessel for suitable time with a shaking device such as a shaker. Note that, as necessary, the particle diameter of the wet gel can also be adjusted by using a jet mill, a roller mill, a bead mill, and the like.

(Washing and Solvent-Substituting Step)

The washing and solvent-substituting step is a step including a step (a washing step) of washing the wet gel obtained by the wet gel generating step or the wet gel pulverizing step and a step (a solvent-substituting step) of substituting a washing liquid in the wet gel with a solvent suitable for a drying condition (the drying step described below). The washing and solvent-substituting step can be carried out by performing only the solvent-substituting step without performing the step of washing the wet gel, and the wet gel may be washed from the viewpoint of reducing the impurities in the wet gel, such as an unreacted material and a by-product, and of enabling the aerogel particles having higher purity to be manufactured.

In the washing step, the wet gel obtained by the wet gel generating step or the wet gel pulverizing step is washed. The washing, for example, can be repeatedly performed by using water or an organic solvent. In this case, a washing efficiency can be further improved by warming.

As the organic solvent, various organic solvents such as methanol, ethanol, 1-propanol, 2-propanol, 1-butanol, acetone, methyl ethyl ketone, 1,2-dimethoxyethane, acetonitrile, hexane, toluene, diethyl ether, chloroform, ethyl acetate, tetrahydrofuran, methylene chloride, N, N-dimethyl formamide, dimethyl sulfoxide, an acetic acid, and a formic acid can be used. The organic solvent described above may be used alone, or two or more types thereof may be used by being mixed.

In the solvent-substituting step described below, a solvent having a low surface tension can be used in order to suppress the shrinkage of the gel due to the drying. However, the solvent having a low surface tension generally has extremely low mutual solubility with water. Therefore, when the solvent having a low surface tension is used in the solvent-substituting step, examples of the organic solvent used in the washing step include a hydrophilic organic solvent having high mutual solubility with both of water and the solvent having a low surface tension. Note that, the hydrophilic organic solvent used in the washing step is capable of functioning as preliminary substitution for the solvent-substituting step. Among the organic solvents described above, examples of the hydrophilic organic solvent include the methanol, the ethanol, the 2-propanol, the acetone, the methyl ethyl ketone, and the like. Note that, the methanol, the ethanol, the methyl ethyl ketone, and the like are excellent from the viewpoint of the economic efficiency.

The amount of water or organic solvent used in the washing step can be an amount in which the solvent of the wet gel can be sufficiently substituted and the washing can be performed. The amount can be 3 to 10 times the volume of wet gel. The washing can be repeatedly performed until a moisture content in the wet gel after the washing is 10 mass % or less with respect to the mass of the silica.

A temperature environment in the washing step can be a temperature of lower than or equal to a boiling point of the solvent used in the washing, and for example, when using methanol, warming to approximately 30 to 60° C. can be performed.

In the solvent-substituting step, the solvent of the washed wet gel is substituted with a predetermined solvent for substitution in order to suppress the shrinkage of the aerogel in the drying step. In this case, a substitution efficiency can be further improved by warming. In the drying step, when performing the drying at a temperature lower than a critical point of a solvent used in the drying and at the atmospheric pressure, examples of the solvent for substitution specifically include a solvent having a low surface tension described below. On the other hand, when performing supercritical drying, examples of the solvent for substitution include ethanol, methanol, 2-propanol, dichlorodifluoromethane, carbon dioxide, and the like, or a solvent obtained by mixing two or more types thereof.

Examples of the solvent having a low surface tension include a solvent having a surface tension of 30 mN/m or less at 20° C. Note that, The surface tension may be 25 mN/m or less or 20 mN/m or less. Examples of the solvent having a low surface tension include aliphatic hydrocarbons such as pentane (15.5), hexane (18.4), heptane (20.2), octane (21.7), 2-methyl pentane (17.4), 3-methyl pentane (18.1), 2-methyl hexane (19.3), cyclopentane (22.6), cyclohexane (25.2), and 1-pentene (16.0); aromatic hydrocarbons such as benzene (28.9), toluene (28.5), m-xylene (28.7), and p-xylene (28.3); halogenated hydrocarbons such as dichloromethane (27.9), chloroform (27.2), carbon tetrachloride (26.9), 1-chloropropane (21.8), and 2-chloropropane (18.1); ethers such as ethyl ether (17.1), propyl ether (20.5), isopropyl ether (17.7), butyl ethyl ether (20.8), and 1,2-dimethoxyethane (24.6); ketones such as acetone (23.3), methyl ethyl ketone (24.6), methyl propyl ketone (25.1), and diethyl ketone (25.3); esters such as methyl acetate (24.8), ethyl acetate (23.8), propyl acetate (24.3), isopropyl acetate (21.2), isobutyl acetate (23.7), and ethyl butyrate (24.6), and the like (numbers in parentheses indicate a surface tension at 20° C., and the unit is [mN/m]). Among them, the aliphatic hydrocarbons (hexane, heptanes, and the like) have a low surface tension and are excellent in working environment. In addition, among them, by using the hydrophilic organic solvent such as acetone, methyl ethyl ketone, and 1,2-dimethoxyethane, the hydrophilic organic solvent is also capable of functioning as the organic solvent in the washing step described above. Note that, among them, a solvent having a boiling point of 100° C. or lower at the normal pressure may be used from the viewpoint of more easily performing the drying in the drying step described below. The solvent described above may be used alone, or two or more types thereof may be used by being mixed.

The amount of solvent used in the solvent-substituting step can be an amount in which the solvent of the wet gel after the washing is sufficiently substituted. The amount can be 3 to 10 times the volume of wet gel.

A temperature environment in the solvent-substituting step can be a temperature of lower than or equal to a boiling point of the solvent used in the substitution, and for example, when using heptane, warming to approximately 30 to 60° C. can be performed.

Note that, when the silica particles are contained in the gel, the solvent-substituting step is not essential. A mechanism to be assumed is as follows. That is, since the silica particles function as a support of a three-dimensional net-like skeleton, the skeleton is supported, and the shrinkage of the gel in the drying step is suppressed. Therefore, it is considered that the gel can be directly applied to the drying step without substituting the solvent used in the washing. As described above, by using the silica particles, the washing and solvent-substituting step to the drying step can be simplified.

(Drying Step)

In the drying step, as described above, the wet gel that is washed and (as necessary) solvent-substituted is dried. Accordingly, the aerogel (an aerogel block or the aerogel particles) can be obtained. That is, the aerogel obtained by drying the wet gel generated from the sol described above can be obtained.

A drying method is not particularly limited, and known normal-pressure drying, known supercritical drying, or known freeze drying can be used. Among them, the normal-pressure drying or the supercritical drying can be used from the viewpoint of easily manufacturing low-density aerogel. In addition, the normal-pressure drying can be used from the viewpoint of low-cost production. Note that, in this embodiment, the normal pressure indicates 0.1 MPa (the atmospheric pressure).

The aerogel can be obtained by drying the wet gel that is washed and (as necessary) solvent-substituted at a temperature of lower than the critical point of the solvent used in the drying and at the atmospheric pressure. A drying temperature is different in accordance with the type of substituted solvent (when the solvent substitution is not performed, the solvent used in the washing), and in particular, can be 20 to 150° C. in consideration of the fact that drying at a high temperature may increase a vaporization rate of the solvent and cause large cracks in the gel. Note that, the drying temperature may be 60 to 120° C. In addition, a drying time is different in accordance with the volume of wet gel and the drying temperature, and can be 4 to 120 hours. Note that, accelerating the drying by applying a pressure of lower than a critical point within a range not impairing productivity is also included in the normal-pressure drying.

In addition, the aerogel can also be obtained by performing the supercritical drying with respect to the wet gel that is washed and (as necessary) solvent-substituted. The supercritical drying can be performed by a known method.

Examples of the method for performing the supercritical drying include a method for removing the solvent at a temperature and a pressure of higher than or equal to the critical point of the solvent contained in the wet gel. Alternatively, examples of the method for performing the supercritical drying include a method for immersing the wet gel in liquefied carbon dioxide, for example, in a condition of approximately 20 to 25° C. and 5 to 20 MPa to substitute the entire solvent or a part of the solvent contained in the wet gel with carbon dioxide having a low critical point from the solvent, and then, to remove only the carbon dioxide or a mixture of the carbon dioxide and the solvent.

The aerogel obtained by the normal-pressure drying or the supercritical drying may be additionally dried at the normal pressure and at 105 to 200° C. for approximately 0.5 to 2 hours. Accordingly, the aerogel having a low density and small fine pores is more easily obtained. The additional drying may be performed at the normal pressure and at 150 to 200° C.

(Pulverizing Step)

When the wet gel pulverizing step is not performed, the aerogel particles are obtained by pulverizing the aerogel (the aerogel block) obtained by the drying. For example, the aerogel particles can be obtained by putting the aerogel in a jet mill, a roller mill, a bead mill, a hammer mill, and the like, and by operating the mill at suitable number of rotations for suitable time.

<Water-Soluble Polymer>

In this embodiment, the water-soluble polymer may have a hydrophobic group and water-solubility.

Examples of the hydrophobic group include an alkyl group (preferably, a long-chain alkyl group having 6 to 26 carbon atoms), an ester group, an alkoxy group, halogen, and the like. Among them, as the hydrophobic group, the alkyl group is preferable, a long-chain alkyl group having 8 to 26 carbon atoms is more preferable, a long-chain alkyl group having 10 to 26 carbon atoms is even more preferable, and a long-chain alkyl group having 12 to 26 carbon atoms is still even more preferable, and the hydrophobic group may be a long-chain alkyl group having 15 to 26 carbon atoms.

Examples of the water-soluble polymer include a modified carboxyl vinyl polymer, modified polyether urethane, a cellulosic resin, polyethylene oxide, polyvinyl alcohol, a polyacrylate, polyvinyl pyrrolidone, a dextrin-based resin, a chitin-based resin, a chitosan-based resin, and the like.

As the water-soluble polymer, the cellulosic resin can be preferably used. Examples of the cellulosic resin include methyl cellulose, carboxymethyl cellulose, hydroxyethyl cellulose, hydroxypropyl methyl cellulose, a modified product obtained by further modifying (for example, hydrophobizing) the above, and the like.

As the cellulosic resin, a cellulosic resin having an alkyl group is preferable, and a cellulosic resin having a long-chain alkyl group having 6 to 26 carbon atoms is more preferable. According to such a cellulosic resin, the effects of the present invention are more remarkably exhibited. The number of carbon atoms of the long-chain alkyl group is preferably 8 to 26, more preferably 10 to 26, even more preferably 12 to 26, and still even more preferably 15 to 26.

As the cellulosic resin, for example, a cellulosic resin having a structure unit represented by Formula (A-1) described below is preferable.

[Chemical Formula 11]

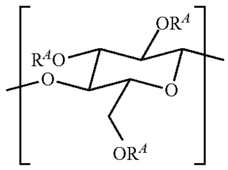

(A-1)

In Formula (A-1), $R^A$ indicates a hydrogen atom, an alkyl group, a hydroxyalkyl group, and a group represented by $—R^{A1}—O—R^{A2}$ ($R^{A1}$ indicates an alkane diyl group or a hydroxyalkane diyl group, and $R^{A2}$ indicates an alkyl group). Three $R^A$s may be identical to each other or different from each other. Here, at least one of three $R^A$s is the alkyl group or the group represented by $—R^{A1}—O—R^{A2}$.

In Formula (A-1), as the alkyl group of $R^A$, an alkyl group having 1 to 26 carbon atoms is preferable. In addition, as the alkyl group of $R^A$, a short-chain alkyl group having 1 to 3 carbon atoms or a long-chain alkyl group having 6 to 26 carbon atoms is more preferable. The number of carbon atoms of the long-chain alkyl group is preferably 8 to 26, more preferably 10 to 26, even more preferably 12 to 26, and still even more preferably 15 to 26.

In Formula (A-1), as the hydroxyalkyl group of $R^A$, a hydroxyalkyl group having 1 to 26 carbon atoms is preferable, a hydroxyalkyl group having 1 to 10 carbon atoms is more preferable, and a hydroxyalkyl group having 1 to 5 carbon atoms is even more preferable.

In Formula (A-1), the alkane diyl group of $R^{A1}$ is preferably an alkane diyl group having 1 to 26 carbon atoms, more preferably an alkane diyl group having 1 to 10 carbon atoms, and even more preferably an alkane diyl group having 1 to 5 carbon atoms. In addition, the hydroxyalkane diyl group of $R^{A1}$ is preferably a hydroxyalkane diyl group having 1 to 26 carbon atoms, more preferably a hydroxyalkane diyl group having 1 to 10 carbon atoms, and even more preferably a hydroxyalkane diyl group having 1 to 5 carbon atoms.

In Formula (A-1), as $R^{A2}$, an alkyl group having 1 to 26 carbon atoms is preferable. In addition, as the alkyl group of $R^{A2}$, a short-chain alkyl group having 1 to 3 carbon atoms or a long-chain alkyl group having 6 to 26 carbon atoms is more preferable, and the long-chain alkyl group is more preferable. The number of carbon atoms of the long-chain alkyl group is preferably 8 to 26, more preferably 10 to 26, even more preferably 12 to 26, and still even more preferably 15 to 26.

In Formula (A-1), it is preferable that at least one of three $R^A$s is the long-chain alkyl group, or at least one of three $R^A$s is the group represented by $—R^{A1}—O—R^{A2}$ and $R^{A2}$ is the long-chain alkyl group.

In the cellulosic resin, the content of the long-chain alkyl group having 6 to 26 carbon atoms is preferably 0.01 to 5 mass %, and more preferably 0.01 to 3 mass %, on the basis of the total amount of the cellulosic resin.

In this embodiment, the content of the water-soluble polymer in the coating liquid, for example, may be 0.01 volume % or more, and is preferably 0.1 volume % or more, and more preferably 0.3 volume % or more, on the basis of the total volume of the solid contents in the coating liquid. In addition, the content of the water-soluble polymer, for example, may be 10 volume % or less, and is preferably 5 volume % or less, and more preferably 3 volume % or less, on the basis of the total volume of the solid contents in the coating liquid.

<Liquid Medium>

As the liquid medium, an aqueous solvent containing water is preferable. In the aqueous solvent, an organic solvent other than water may be contained. The organic solvent may have compatibility with water, and examples thereof include alcohols such as methanol, ethanol, isopropanol, butanol, ethylene glycol, and propylene glycol; ethers such as diethyl ether, tetrahydrofuran, and 1,4-dioxane; ketones such as acetone and methyl ethyl ketone; a carboxylic acid such as an acetic acid and a propionic acid; a nitrogen-containing compound such as acetonitrile, dimethyl formamide, and triethyl amine, and the like.

In this embodiment, the content of the liquid medium in the coating liquid is not particularly limited, and may be suitably changed in accordance with a desired viscosity of the coating liquid, and the like. For example, the content of the liquid medium may be an amount in which a solid contents concentration of the coating liquid is in a suitable range described below.

The solid contents concentration of the coating liquid, for example, may be 10 mass % or more, and is preferably 15 mass % or more, and more preferably 20 mass % or more. In addition, the solid contents concentration of the coating liquid, for example, may be 70 mass % or less, and is preferably 60 mass % or less, and more preferably 50 mass % or less.

<Other Components>

In this embodiment, the coating liquid may further contain other components in addition to the aerogel particles, the water-soluble polymer, and the liquid medium.

The coating liquid according to this embodiment, for example, may further contain a binder resin. Examples of the binder resin include an epoxy resin, a silicone resin, a phenolic resin, a urea resin, a melamine resin, a polyurethane resin, a polyethylene resin, a polypropylene resin, a polystyrene resin, a polyester resin, an acrylic resin, a polyvinyl chloride resin, a polyvinyl acetate resin, a polyamide resin, a polyimide resin, a polyvinyl-based resin, and the like. Among them, the silicone resin, the acrylic resin, the phenolic resin, the polyester resin, and the like can be preferably used from the viewpoint of heat resistance and toughness.

In this embodiment, when the coating liquid contains the binder resin, the content of the binder resin in the coating liquid, for example, may be 30 volume % or less, and is preferably 28 volume % or less, and more preferably 25 volume % or less, on the basis of the total volume of the solid contents. In addition, the content of the binder resin in the coating liquid, for example, may be 0.1 volume % or more, or 1 volume % or more, on the basis of the total volume of the solid contents.

In addition, a composite material according to this embodiment may further contain a thickener, a fibrous substance, a pigment, a leveling agent, and the like, as the other components described above.

Examples of the thickener include fine particles such as fumed silica and a clay mineral.

The fibrous substance is capable of exhibiting an anchor function between the aerogel particles and of further improving the strength of the coated film of the composite material. The fibrous substance is not particularly limited, and examples thereof include an organic fiber and an inorganic fiber. Examples of the organic fiber include a polyamide-based fiber, a polyimide-based fiber, a polyvinyl alcohol-based fiber, a polyvinylidene chloride-based fiber, a polyvinyl chloride-based fiber, a polyester-based fiber, a polyacrylonitrile-based fiber, a polyethylene-based fiber, a polypropylene-based fiber, a polyurethane-based fiber, a phenolic fiber, a polyether ester-based fiber, a polylactic acid-based fiber, a polycarbonate-based fiber, and the like. Examples of the inorganic fiber include a glass fiber, a carbon fiber, a ceramic fiber, a metal fiber, and the like.

<Manufacturing Method for Coating Liquid>

In this embodiment, the coating liquid may be manufactured by a manufacturing method including a preparing step of preparing the aerogel particles, the water-soluble polymer, and the liquid medium, and a mixing step of mixing the aerogel particles, the water-soluble polymer, and the liquid medium prepared in the preparing step and of aggregating the aerogel particles to obtain the coating liquid containing the aggregates of the aerogel particles, the water-soluble polymer, and the liquid medium.

In the preparing step, other components in addition to the aerogel particles, the water-soluble polymer, and the liquid medium (for example, the components described in <Other Components>) may be further prepared.

In the mixing step, each of the components prepared in the preparing step is mixed such that the aerogel particles are aggregated. A mixing method may be a method in which the aerogel particles are capable of forming the aggregates, and examples thereof include a method for stirring and mixing each of the components prepared in the preparing step.

A stirring rate affects the size of the aggregates. Since a shear stress is applied to the coating liquid as the stirring rate increases, the size of the aggregates tends to decrease. Therefore, it is desirable to prepare the coating liquid at a low stirring rate, from the viewpoint of obtaining the aggregates having a suitable size as described below.

In addition, the viscosity in the mixing also affects the size of the aggregates. The shear stress to be applied to the coating liquid is changed in accordance with the viscosity, even at the same stirring rate. A larger shear stress is applied to the coating liquid as the viscosity increases, and the size of the aggregates decreases. On the other hand, when the viscosity of the coating liquid is low, the shear stress to be applied to the coating liquid decreases even at the same stirring rate, and the size of the aggregates increases. Accordingly, by adjusting the stirring rate in accordance with the viscosity of the coating liquid, the coating liquid having a desired size of the aggregates can be prepared.

In addition, the size of the aggregates can also be changed by an additive. Examples of the additive that strongly affects the size of the aggregates include a surface conditioner, a surfactant, a dispersant, an emulsion resin, and the like.

The surface conditioner and the surfactant decrease surface energy between the aerogel particles and the solution. A force for decreasing the interface is weakened as the surface energy decreases, and the size of the aggregates tends to decrease. Therefore, the addition of the surface conditioner and the surfactant decreases the surface energy, and decreases the size of the aggregates.

The dispersant is attached to the surface of the particles, thereby preventing the particles from approaching each other by an electrostatic repulsive force or a steric barrier repulsive force. Since the dispersant is attached to the surface of the aerogel particles and prevents the aerogel particles from approaching each other, the size of the aggregates is decreased by adding the dispersant.

In the emulsion resin, a resin is dispersed in water mainly by a dispersant. Such an emulsion resin is adsorbed on the surface of the aerogel particles, and prevents the aerogel particles from approaching each other by the accompanying dispersant. That is, the size of the aggregates is decreased by adding the emulsion resin.

In addition, the amount of liquid medium in the mixing also affects the size of the aggregates. Even when the coating liquids to be finally manufactured have the same composition, the size of the aggregates is different between a method (i) for putting the total amount of liquid medium in the initial mixing stage and a method (ii) for mixing a small amount of liquid medium in the initial mixing stage, and then, for adding the liquid medium. In the method (ii) described above, the initial viscosity of the coating liquid increases, compared to the method (i) described above, and when the additive described above is added, the concentration thereof also increases. Therefore, in the method (ii) described above, the size of the aggregates tends to decrease, compared to the method (i) described above. By using differently such methods in accordance with a condition such as the composition of the coating liquid and a mixing device (stirring device), the aggregates having a desired size can be formed.

The contact interface between the aerogel and the resin component decreases as the size of the aggregates increases, and the impregnation of the resin component into the fine pores of the aerogel is more easily suppressed. From such a viewpoint, in this embodiment, it is preferable to form the aggregates having a diameter of 20 μm or more, it is more preferable to form the aggregates having a diameter of 40 μm or more, and it is even more preferable to form the aggregates having a diameter of 50 μm or more. On the other hand, from the viewpoint of avoiding a decrease in film strength due to consecutive comparatively fragile aerogel, the diameter of the aggregates is preferably 400 μm or less, and more preferably 300 μm or less.

In this embodiment, an average diameter of the aggregates is preferably 2 times or more, more preferably 4 times or more, and even more preferably 8 times or more the average diameter of the aerogel particles prepared in the preparing step. Accordingly, the contact interface between the aerogel and the resin component further decreases, and the impregnation of the resin component into the fine pores of the aerogel is more easily suppressed. In addition, the average diameter of the aggregates is preferably 40 times or less, more preferably 30 times or less, and even more preferably 20 times or less the average diameter of the aerogel particles prepared in the preparing step. Accordingly, a decrease in the film strength due to consecutive comparatively fragile aerogel is suppressed, and higher film strength is easily obtained.

Note that, in the present specification, the average diameter of the aggregates indicates a value that is measured by the following method.

[Measurement Method for Average Diameter of Aggregates in Coating Liquid]

Approximately 20 g of the coating liquid is put in a plastic cup of 100 mL, and 2 g of water is added at a time while stirring with a spatula to dilute the coating liquid while gradually blending. A diluted sample is put on a glass plate, and a microscope photograph of the sample is acquired by using an optical microscope (Model Number: BX51, manufactured by Olympus Corporation). The obtained microscope photograph is analyzed by using image editing software ImageJ, and the diameters of a plurality of aggregates in the microscope photograph are obtained. An average value of the obtained values is set to the average diameter of the aggregates.

In addition, in the present specification, the average diameter of the aerogel particles is synonymous with the average particle diameter D50 of the aerogel particles described above.

In this embodiment, when observing the diluted solution obtained by diluting the coating liquid with the optical microscope, an area occupied by the aggregates having a diameter of 20 μm or more (more preferably, the aggregates having a diameter of 50 μm or more) relative to an area occupied by the aerogel particles and the aggregates within an observation visual field is preferably 50% or more, more preferably 60% or more, and even more preferably 70% or more, and may be 100%.

Note that, in the present specification, the diluted solution obtained by diluting the coating liquid and an observation method for the diluted solution may be identical to the sample prepared in [Measurement Method for Average Diameter of Aggregates in Coating Liquid] described above and an observation method for the sample. In addition, the "area occupied by the aggregates having a diameter of 20 μm or more to the area occupied by the aerogel particles and the aggregates within the observation visual field" is obtained by analyzing the microscope photograph with the image editing software ImageJ.

<Manufacturing Method for Thermal Insulating Material>

In this embodiment, the thermal insulating material is manufactured by a manufacturing method including an applying step of applying the coating liquid described above with a coating means applying a pressure of 1.5 MPa or less to the coating liquid to obtain the coated film, and a removing step of removing at least a part of the liquid medium from the coated film to obtain the thermal insulating material. According to the manufacturing method, since the impregnation of the resin into the fine pores of the aerogel is sufficiently suppressed by aggregating the aerogel particles in the coating liquid, and the coated film can be formed while preventing the aggregates of the aerogel particles from being crushed by adopting a predetermined coating means, the thermal insulating material having high thermal insulating properties and high film formability is obtained.

A coating target for the coating liquid is not particularly limited. The coating target (for example, the support) may be peeled off from the thermal insulating material after manufacturing the thermal insulating material, or may be used without being peeled off from the thermal insulating material. The target, for example, may be an application target for the thermal insulating material. A material configuring the target is not particularly limited, and for example, may be a metal, ceramic, glass, a resin, a composite material thereof, and the like. In addition, the shape of the target may be suitably selected in accordance with the intended use, the material, and the like, and for example, may be a block shape, a sheet shape, a powder shape, a fiber shape, and the like.

A coating method for the coating liquid is not particularly limited, and may be a method for applying a pressure of 1.5 MPa or less to the coating liquid. For example, a coating method such as roller coating, trowel coating, and air spray easily reduces the pressure to be applied to the coating liquid, which is preferable.

In the removing step, by removing at least a part of the liquid medium from the coated film, the thermal insulating material containing the composite material that contains the aggregates of the aerogel particles and the water-soluble resin is formed.

A method for removing the liquid medium from the coated film is not particularly limited, and examples thereof include a method for performing a heating (for example, 40 to 150° C.) treatment, a depressurization (for example, 10000 Pa or less) treatment, or both of the treatments.

The thickness of the thermal insulating material is not particularly limited, and for example, may be 0.01 to 30 mm or 0.1 to 20 mm.

The thermal insulating material includes fine pores caused by the aerogel particles. A pore volume of the thermal insulating material is preferably 0.15 $cm^3/g$ or more, more preferably 0.20 $cm^3/g$ or more, and even more preferably 0.60 $cm^3/g$ or more, from the viewpoint of obtaining higher thermal insulating properties. An upper limit of the pore volume of the thermal insulating material is not particularly limited. The pore volume of the thermal insulating material, for example, may be 5.0 $cm^3/g$ or less.

A heat conductivity of the thermal insulating material, for example, is 0.05 W/(m·K) or less, is preferably 0.04 W/(m·K) or less, more preferably 0.035 W/(m·K) or less. A lower limit of the heat conductivity of the thermal insulating material is not particularly limited. The heat conductivity of the thermal insulating material, for example, may be 0.01 W/(m·K) or more.

The thermal insulating material to be manufactured by the manufacturing method of this embodiment has excellent thermal insulating properties, excellent heat resistance, excellent flame resistance, and the like, which are derived from the aerogel. Therefore, the thermal insulating material can be applied to an application as a thermal insulating material in a cryogenic vessel, the space field, the architecture field, the automotive field, the home electronics field, the semiconductor field, industrial facilities, and the like. Note that, the thermal insulating material can also be used as a water repellent material, an acoustic absorbent, a seiche material, a catalyst supporting material, and the like, in addition to the application as the thermal insulating material.

Suitable embodiments of the present invention have been described, but the present invention is not limited to the embodiments described above.

EXAMPLES

Hereinafter, the present invention will be described in more detail by Examples, but the present invention is not limited to Examples described below.

(Manufacturing Method for Coating Liquid)

6 parts by mass of SANGELOSE 90L (manufactured by Daido Chemical Corporation), as the water-soluble polymer, 46 parts by mass of isopropyl alcohol (a reagent, manufactured by FUJIFILM Wako Pure Chemical Corporation), and 840 parts by mass of hot water were put in a separable flask of 500 mL, and were stirred with a mechanical stirrer at 200 rpm for 1 minute to obtain a dispersion liquid. Subsequently, the flask was stirred with a mechanical stirrer at 200 rpm while cooling with an ice water bath such that SANGELOSE 90L was dissolved, and pregel that was an aqueous solution of SANGELOSE 90L was obtained. 892 parts by mass of the pregel described above and 1000 parts by mass of an aqueous solution of acrylic resin emulsion (Product Name: VONCOAT DV759-EF, manufactured by DIC Corporation) were put in a planetary mixer (2P-1 type, manufactured by PRIMIX Corporation), and were stirred at 100 rpm. Subsequently, 100 parts by mass of aerogel particles (Product Name: ENOVA MT1100, a particles diameter of 2 to 24 μm and an average particle diameter (D50) of 10 μm, manufactured by Cabot Corporation) was added, and then, was stirred at 100 rpm to obtain a coating liquid. Note that, in the coating liquid, the content of the aerogel particles was 74.7 volume %, the content of the water-soluble polymer was 0.4 volume %, and the content of the acrylic resin was 24.9 volume %, on the basis of the total volume of the solid contents.

Example 1

100 parts by mass of the coating liquid prepared as described above and 10 parts by mass of pure water were put in a plastic cup, and were stirred with a mechanical stirrer at 200 rpm for 5 minutes to dilute the coating liquid. The diluted coating liquid was applied to an aluminum foil (Product Name: Thick Type Myfoil 50, Thickness: 50 μm, manufactured by UACJ Corporation) with a sand aggregate roller (a sand aggregate regular roller with a coarse mesh of 4 inches, manufactured by Ohtsuka Brush Mfg. Co., Ltd.) while applying a load of 500 g such that the thickness of the coating liquid was 2 mm, the liquid medium was removed from the coating liquid by being left to stand at a room temperature of 23° C. for 12 hours, and a thermal insulating material was obtained. The pressure to be applied to the coating liquid during the coating with the roller was 25 kPa in terms of a bearing area of the roller and the load.

Example 2

The diluted solution prepared in Example 1 was put in a multi-purpose gun (SGA-2, manufactured by Meiji Machine Co., Ltd.), was applied to an aluminum foil as with Example 1 at a coating material nozzle diameter of 5.5 mm and a spraying air pressure of 0.06 MPa, and was dried to obtain a thermal insulating material.

Example 3

The diluted solution prepared in Example 1 was applied to an aluminum foil as with Example 1, at a liquid feeding pressure of 0.3 MPa, by using a pressure feeding tank (P-2A, manufactured by Meiji Machine Co., Ltd.) and a spray gun (F210-P12P, manufactured by Meiji Machine Co., Ltd.), and was dried to obtain a thermal insulating material.

Comparative Example 1

The diluted solution prepared in Example 1 was put in a dedicated cup for an airless spray (Ultra Max, manufactured by Graco Inc.), was applied to an aluminum foil as with Example 1, at a coating pressure of 3.4 MPa, and was dried to obtain a thermal insulating material.

Examples and Comparative Example were evaluated by the following method. Results are shown in Table 1.

<Microscope Observation of Coating Liquid>

Approximately 20 g of the coating liquid was put in a plastic cup of 100 mL, and 2 g of water was added at a time while stirring with a spatula to dilute the coating liquid while gradually blending. A diluted sample was put on a glass plate, and the aerogel particles and the aggregates thereof in the coating liquid were observed with an optical microscope (Model Number: BX51, manufactured by Olympus Corporation) to obtain a microscope photograph. The obtained microscope photograph was analyzed by using image editing software ImageJ, and the average diameter of the aggregates of the aerogel particles was obtained.

<Crack Evaluation of Thermal Insulating Material>

The coating liquid was applied onto an aluminum foil (Product Name: Thick Type Myfoil 50, Thickness: 50 μm, manufactured by UACJ Corporation) attached to an aluminum plate (25 cm×40 cm×0.1 cm) that is a support plate by using the method described in Examples or Comparative Example such that a length and a breadth were 200 to 250 mm and the thickness of the coating liquid was 2 mm, and the liquid medium was removed from the coating liquid by being left to stand at a room temperature of 23° C. for 12 hours, and a thermal insulating material was obtained. The state of cracks in the obtained thermal insulating material was evaluated such that a case where there were no cracks in the entire thermal insulating material was evaluated as A, a case where there were cracks in a part of the thermal insulating material was evaluated as B, and a case where there were cracks in the entire thermal insulating material was evaluated as C.

<Evaluation of Pore Volume of Thermal Insulating Material>

A thermal insulating material was prepared by the same method as that in <Crack Evaluation of Thermal Insulating Material> described above. 100 mg of the prepared thermal insulating material was sampled, and a pore volume was calculated with a high-sensitivity gaseous adsorption analyzer (AutoSorb iQ, manufactured by Quantachrome Corporation).

<Evaluation of Heat Conductivity of Thermal Insulating Material>

A thermal insulating material was prepared on an aluminum foil (Product Name: Thick Type Myfoil 50, Thickness: 50 μm, manufactured by UACJ Corporation) by the same method as that in <Crack Evaluation of Thermal Insulating Material>, a plate-shaped sample having a length and a breadth of 200 to 250 mm and a thickness of 3 mm was prepared by overspraying the coating liquid twice and was dried, the aluminum foil was peeled off, and an end portion was cut off such that a length and a breadth were 200 mm. A heat conductivity of the obtained thermal insulating material was measured by a steady method using a heat conductivity measurement device "HFM-446" (Product Name, manufactured by Erich NETZSCH GmbH & Co. Holding KG). Note that, this evaluation was performed only with respect to the coating liquids of Example 1 and Comparative Example 1.

| | Example 1 | Example 2 | Example 3 | Comparative Example 1 |
|---|---|---|---|---|
| Average diameter of aggregates (μm) | 93 | 93 | 93 | 93 |
| Coating pressure (MPa) | 0.025 | 0.06 | 0.30 | 3.5 |
| Crack evaluation | A | A | A | C |
| Pore volume ($cm^3/g$) | 0.67 | 0.53 | 0.28 | 0.12 |
| Heat conductivity (W/(m · K)) | 0.034 | — | — | 0.060 |

As shown in Table 1, in Examples, a high pore volume and high thermal insulating properties were attained, and cracks when forming a film were also suppressed. On the other hand, in Comparative Example, the pore volume was small, the heat conductivity was high, and the cracks occurred in the entire film when formed, due to the coating means.

The invention claimed is:

1. A method for manufacturing a thermal insulating material, the method comprising:

applying a coating liquid onto a substrate under a pressure of 1.5 MPa or less with a coater configured to exert the pressure on the coating liquid, to obtain a coated film, wherein the coating liquid is obtained by mixing aerogel particles, a water-soluble polymer having a hydrophobic group, and a liquid medium under conditions that cause aggregation of the aerogel particles and that result in the coating liquid having, when a diluted solution of the coating liquid is subjected to observation with an optical microscope, an area occupied by the aggregates having a diameter of 20 μm or more relative to an area occupied by the aerogel particles and the aggregates of the aerogel particles within an observation visual field of 50% or more; and removing at least a part of the liquid medium from the coated film to obtain the thermal insulating material.

2. The method according to claim 1, wherein the coating liquid comprises aggregates of the aerogel particles, and an average diameter of the aggregates is 2 to 40 times an average diameter of the aerogel particles.

3. The method according to claim 1, wherein a total content of the aerogel particles and aggregates of the aerogel particles in the coating liquid is 70 volume % or more on the basis of a total volume of solid contents.

4. The method according to claim 1, wherein the water-soluble polymer comprises a cellulosic resin.

5. The method according to claim 1, wherein a pore volume of the thermal insulating material is 0.15 $cm^3/g$ or more.

6. The method according to claim 1, wherein the water-soluble polymer comprises a cellulosic resin having a long-chain alkyl group having 6 to 26 carbon atoms.

7. The method according to claim 1, further comprising:

mixing the aerogel particles, the water-soluble polymer, and the liquid medium at a stirring rate to form aggregates of the aerogel particles, wherein the stirring rate limits an average diameter of the aggregates to be 2 to 40 times an average diameter of the aerogel particles; and prior to applying the coating liquid onto the substrate, forming the coating liquid having the area occupied by the aggregates having the diameter of 20 μm or more relative to the area occupied by the aerogel particles and the aggregates of the aerogel particles within the observation visual field of 50% or more.

8. The method according to claim 7, wherein the stirring rate is adjusted in accordance with a viscosity of the coating liquid to limit the average diameter of the aggregates.

9. The method according to claim 7, wherein an additive is mixed with the aerogel particles, the water-soluble polymer, and the liquid medium to further limit the average diameter of the aggregates.

10. The method according to claim 9, wherein the additive comprises at least one selected from the group consisting of a conditioner, a surfactant, a dispersant and an emulsion resin.

11. The method according to claim 9, wherein the additive comprises one or both of a surface conditioner and a surfactant that decreases a surface energy between the aerogel particles and a solution comprising the water-soluble polymer and the liquid medium.

12. The method according to claim 9, wherein the additive comprises a dispersant that attaches to a surface of the aerogel particles and forms an electrostatic repulsive force or a steric barrier repulsive force that prevents the aerogel particles from approaching each other.

13. The method according to claim 12, wherein the additive comprises an emulsion resin that is dispersed in the liquid medium by the dispersant and is adsorbed on the surface of the aerogel particles.

* * * * *